(12) United States Patent
Liu et al.

(10) Patent No.: US 11,391,408 B2
(45) Date of Patent: Jul. 19, 2022

(54) INTELLIGENT AND DURABLE BURIED DRAINAGE PIPE AND A METHOD OF SEPARATION AND TRANSMISSION

(71) Applicant: CHANGSHA UNIVERSITY OF SCIENCE & TECHNOLOGY, Changsha (CN)

(72) Inventors: Zhiqiang Liu, Changsha (CN); Jie Wen, Changsha (CN); Chengjie Jiang, Changsha (CN)

(73) Assignee: CHANGSHA UNIVERSITY OF SCIENCE & TECHNOLOGY, Changsha (CN)

( * ) Notice: Subject to any disclaimer, the term of this patent is extended or adjusted under 35 U.S.C. 154(b) by 0 days.

(21) Appl. No.: 17/539,044

(22) Filed: Nov. 30, 2021

(65) Prior Publication Data

US 2022/0082197 A1    Mar. 17, 2022

Related U.S. Application Data

(63) Continuation of application No. PCT/CN2020/011551, filed on May 26, 2021.

(30) Foreign Application Priority Data

Sep. 4, 2020    (CN) .......................... 202010924177.6

(51) Int. Cl.
*F16L 55/24*    (2006.01)
*F16L 9/18*    (2006.01)
(Continued)

(52) U.S. Cl.
CPC .............. *F16L 55/24* (2013.01); *B03C 1/288* (2013.01); *C02F 1/482* (2013.01); *C02F 1/485* (2013.01); *F16L 9/18* (2013.01); *B03C 2201/18* (2013.01)

(58) Field of Classification Search
None
See application file for complete search history.

(56) References Cited

U.S. PATENT DOCUMENTS 3,402,820 A * 9/1968 Lohmann ................ B03C 1/288
210/222
4,176,065 A * 11/1979 Cook ...................... B01D 35/06
209/223.1
(Continued)

FOREIGN PATENT DOCUMENTS

CN    102078725 A    6/2011
CN    102215975 A    10/2011
(Continued)

OTHER PUBLICATIONS

International Search Report of PCT/CN2020/115518.
Written Opinion of PCT/CN2020/115518.

*Primary Examiner* — David C Mellon
(74) *Attorney, Agent, or Firm* — Dragon Sun Law Firm, P.C; Jinggao Li, Esq.

(57) ABSTRACT

The present invention is related to an intelligent and durable buried drainage pipe involving a method of separation and transmission. The intelligent and durable buried drainage pipe of the present invention includes an inner (11) and an outer (12) pipe. The outer pipe (12) is longer than the inner pipe (11); a permanent magnet (2) is installed on a section of the outer pipe (12) that is longer than the inner pipe (11). At least one electromagnet (3) is fixed at intervals from the permanent magnet (2); the energized electromagnet (3) can attract the permanent magnet (2) causing it to slide. The end of the electromagnet (3) facing the permanent magnet (2) is provided with a distance sensor (6), and the switch is turned on/off by the distance sensor (6). An elastic telescopic member (4) is arranged between the permanent magnet (2) and the electromagnet (3).

7 Claims, 1 Drawing Sheet

(51) Int. Cl.
*C02F 1/48* (2006.01)
*B03C 1/28* (2006.01)

(56) References Cited

U.S. PATENT DOCUMENTS

| | | | | |
|---|---|---|---|---|
| 5,755,970 | A | * 5/1998 | Fourqurean | ............... F17D 3/16 |
| | | | | 210/695 |
| 2003/0121862 | A1 | * 7/2003 | Holland | .................. E21B 36/04 |
| | | | | 210/695 |
| 2008/0099382 | A1 | 5/2008 | Shih | |
| 2018/0311680 | A1 | * 11/2018 | Hanai | ....................... C02F 1/00 |

FOREIGN PATENT DOCUMENTS

| | | | |
|---|---|---|---|
| CN | 103846161 | A | 6/2014 |
| CN | 205868532 | U | 1/2017 |
| CN | 207455052 | U | 6/2018 |
| CN | 108686832 | A | 10/2018 |
| CN | 109604292 | A | 4/2019 |
| CN | 110681486 | A | 1/2020 |
| CN | 210356286 | U | 4/2020 |
| DE | 20312029 | U1 | 11/2003 |
| FR | 2641983 | A1 | 7/1990 |
| JP | 38206420 | A | 8/1996 |
| WO | 2013151415 | A1 | 10/2013 |

\* cited by examiner

INTELLIGENT AND DURABLE BURIED DRAINAGE PIPE AND A METHOD OF SEPARATION AND TRANSMISSION

CROSS-REFERENCE TO RELATED APPLICATIONS

This application is a bypass continuation application of PCT application no.: PCT/CN2020/11551. This application claims priorities from PCT Application No. PCT/CN2020/11551, filed May 26, 2021, and from the Chinese patent application 202010924177.6 filed Sep. 4, 2020, the contents of which are incorporated herein in the entirety by reference.

TECHNICAL FIELD

The invention is related to an intelligent and durable buried drainage pipe, which includes a pipe made of non-magnetic and aging-resistant materials. The pipe has at least one section with two layers, which are divided into an inner and an outer pipe, and extends to a drain.

The invention also pertains to a method of separation and transmission using the aforesaid intelligent and durable buried drainage pipe.

BACKGROUND ART

The issued specification of the Chinese Utility Model No. CN204896813U (Issuance date: Dec. 23, 2015) discloses a device for transmission using buried drainage pipes made from solid beads of expanded polystyrene (EPS) and is used for producing sheets of EPS. The device is connected by three sections of stainless steel pipes. There is an angle between the pipes on both sides, which makes the three sections of stainless steel pipes form a "⌣"-shaped structure. Based on the power of the draft fan at the discharge port, the angle of connecting the three sections of stainless steel pipes may be changed appropriately without affecting the deformation of the EPS beads. This device can also be manufactured from other materials with high wear resistance, corrosion resistance and great strength.

The issued specification of the Chinese Utility Model No. CN207712980U (Issuance date: Aug. 10, 2018) describes a buried low-carbon pipeline using a pneumatic conveying system for garbage, which includes an inner pipe and a protective pipe outside the inner pipe. A gap is provided between the inner and protective pipes. A number of dowel blocks are fixed and installed on the inner wall of the protective pipe. On the dowel blocks there is a buffer chamber in which a number of mobile pillars are movably mounted. The top end of the mobile pillar may movably extend to the outside of the dowel blocks and is fixed and connected to the external side of the inner pipe. A first buffer spring is provided between the inner pipe and the dowel block, and is sleeved on the mobile pillar. The top end of the first buffer spring is fixed and connected with the inner pipe, and the bottom end of the first buffer spring is fixed and connected to the top of the dowel block.

The issued specification of the Chinese Utility Model No. CN101537934A (Issuance date: Sep. 23, 2009) discloses a solid-liquid separation method using a slow-moving belt. Based on this method, a slow-moving belt used for separation purposes is installed over the conveying belt of the belt conveyor under the fine ore box of heavy plate devices. It allows minerals and muddy water to fall on the separation belt for the preliminary sedimentation process; at an appropriate location under the loading side of the separation belt, a permanent magnet strip is installed horizontally to form a magnetic dam. The magnetic substances contained in the separated muddy water quickly settle when passing through the permanent magnet strip. As the water overflows from the tail of the separation belt to the sump, the intercepted settling magnetic substances and the bottom sediments are offloaded from the front of the separation belt to the conveyor belt and are discharged by the belt conveyor.

The foregoing three prior arts fail to facilitate the intelligent separation and collection of magnetic substances in the water. Magnetic substances are likely to contaminate the magnetic field. Therefore, the magnetic substances in the drainage materials require a centralized treatment and recycling process, which is also not conducive to the treatment of sewage containing ferromagnetic substances.

SUMMARY OF THE INVENTION

The present invention aims to address a technical issue by providing an intelligent and durable buried drainage pipe, which automatically treats magnetic substances in the water, followed by the separation and transmission of those substances in a manner conducive to the centralized treatment and recycling of magnetic substances in the drainage. This also has great effects on the treatment of ferromagnetic substances in sewage.

The invention aims to resolve another technical issue by presenting a method of separation and transmission using the aforesaid intelligent and durable buried drainage pipe.

The intelligent and durable buried drainage pipe of the present invention includes a pipe made of non-magnetic and aging-resistant materials. The pipeline has a section with two layers, which consists of an inner and an outer pipe and extends to a drain. The outer pipe is longer than the inner pipe, and a permanent magnet is arranged on a section of the outer pipe that is longer than the inner pipe. The permanent magnet can slide along the outer wall of the outer pipe, in an axial direction of the pipeline. On the outer pipe, at least one electromagnet is securely mounted at intervals from the permanent magnet. The energized electromagnet can attract the permanent magnet to slide. The distance between the electromagnet and the permanent magnet is greater than the distance between the permanent magnet and the inner pipe along the axial length of the pipeline. The end of the electromagnet facing the permanent magnet is provided with a distance sensor. The coil of the electromagnet is connected to the switch that is controlled to on/off positions by the distance sensor. Between the permanent magnet and the electromagnet, an elastic telescopic member is installed, with one end fixed with the permanent magnet, and the other end secured with the electromagnet. The electromagnet has an attraction force greater than that of the permanent magnet. A housing made of magnetically conductive material casing is sleeved on one section of the outer pipe installed with an electromagnet and a permanent magnet. The substances conveyed by the outer pipe are delivered to the collecting area of magnetic substances, and the inner pipe extends to the drainage area.

Since the outer pipe is longer than the inner pipe, magnetic substances will gather in the outer pipe before entering the inner pipe and be adsorbed on the inner wall of the outer pipe by the permanent magnet. The energized electromagnet can attract the permanent magnet, i.e. the magnetic substances absorbed by the permanent magnet can be transferred and transmitted. The magnetic substances may be ferromagnetic metal or similar materials. The pipeline can also be made of materials with good aging resistance such as polyethylene, chlorinated polyvinyl chloride or hard polyvinyl chloride. The electromagnet should be used to transfer magnetic substances between the inner and outer pipes, and the permanent magnet is used to carry magnetic substances directly between the inner and outer pipes. This not only prevents these substances from entering the inner pipe, but also enables the complete collection of those substances by the outer pipe, as well as the separation and discharge of materials. After the transfer and absorption of magnetic substances by the electromagnet, the distance limit is set by the distance sensor. When the permanent magnet reaches the distance limit and the energized switch of the electromagnet is turned off, the electromagnet will lose its magnetism, and no longer adsorb the magnetic substances which will move toward the permanent magnet. The magnetic substances will flow away along with the water, and the permanent magnet will be bounced by the elastic telescopic member. When the permanent magnet moves to its original position, it will reach another distance limit set by the distance sensor. At this time, the distance sensor will energize the control switch to magnetize the electromagnet, so that the permanent magnet can carry the magnetic substances cyclically and magnetic substances may enter between the inner and outer pipes. The distance sensor can be remotely set by AI and other smart devices, which facilitates the adjustment of the distance limit or inspection and is conducive to the intelligent separation of magnetic materials in the pipeline. The housing made of iron can be used as a housing made of magnetically conducive materials because it prevents magnetic flux leakage. The outer pipe is used to transport magnetic materials to a collecting area of magnetic substances. The inner pipe can be extended by a section to a special drainage area.

Of course, the distance sensor can also be installed along the outer pipe; the permanent magnet is provided between the two distance sensors. That is, one distance sensor is placed behind the permanent magnet to set the distance limit and enable the disconnection of the switch; the other distance sensor is placed in front of the permanent magnet to set the distance limit and enable the connection of the switch.

As an improvement of the intelligent and durable buried drainage pipe of the present invention, the elastic telescopic member is a spring with good telescopic performance and scope. It offers enough distance for the permanent magnet to carry the magnetic substances. This allows magnetic substances to enter between the inner and outer pipes, followed by the bounce-off of the permanent magnet.

As an improvement of an intelligent and durable buried drainage pipe of the present invention, a sliding rod is inserted in the center of the spring, with one end of the sliding rod fixed to the electromagnet, and the other end through the permanent magnet. If the spring falls off, it will still surround the sliding rod and continue to exert its telescopic function, and the sliding rod can also serve as the sliding track of the permanent magnet to prevent its circumferential displacement and cause harm to the spring.

As an improvement of an intelligent and durable buried drainage pipe of the present invention, a fixing bracket for securing the electromagnet is securely mounted on the outer pipe. The fixing bracket consists of two ring plates fixedly arranged along the circumference of the outer pipe. The ring plates are used to fix the front and rear ends of the iron core of the electromagnet. A number of electromagnets are provided at intervals along the ring plate. Two ring plates are fixed and connected by a support rod. The fixing bracket facilitates the installation or removal of the electromagnet.

As an improvement of an intelligent and durable buried drainage pipe of the present invention, an impact device is installed on the ring plate adjacent to the permanent magnet. The impact device includes a slide rail arranged along the axial direction of the outer pipe. One end of the impact device is fixed on the ring plate. The slide rail has a sliding chute distributed along its axial direction. The slidable push block is arranged in the sliding chute and is located between the permanent magnet and the ring plate. The other end of the slide rail slides through and maintains the sliding fit with the permanent magnet. An impact cylinder is fixed onto the ring plate near the sliding chute. The mouth of the impact cylinder faces the sliding chute and is provided with a semi-exposed impact ball. The first elastic member is installed between the impact ball and the bottom of the impact cylinder. One end of the elastic member is fixed and connected to the impact ball, and the other end is fixed and connected to the bottom of the impact cylinder. When the impact ball stops, one half of its bottom abuts against impact block and the other half is closer to the push block than the impact block. The impact block is clamped at the junction of the sliding chute and the ring plate. The bottom of the side of the push block facing the ring plate connects to one end of the second elastic member; the other end of the second elastic member is fixed and connected to the impact block. The side of the push block facing the ring plate is provided with a push rod that extends in the axial direction of the outer pipe; the push rod hits the impact ball and enables the impact ball to slide into the impact cylinder when the push block slides. When the permanent magnet moves toward the electromagnet, it hits and moves the push block. Then the push block travels along the sliding chute toward the impact ball. After the sliding distance is set, the push rod over it hits the impact ball, and the impact ball rushes into the impact cylinder. Under the influence of the first elastic member, the impact ball pops out of the impact cylinder and hits the impact block which transmits the impact to the outer pipe, causing the outer pipe wall to vibrate and to shake off the magnetic substances that have adhered onto the inner wall of the outer pipe. Excessive magnetic substances adhering on the inner wall of the outer pipe are likely to reduce the magnetic force of the permanent magnet or electromagnet in the outer pipe, which is not conducive to transferring more magnetic substances.

As a further improvement of the intelligent and durable buried drainage pipe of the present invention, both the first and second elastic members are springs. Springs are characterized by excellent telescopic performance and scope, and great elasticity.

Regarding the separation and transportation method of the present invention using the foregoing intelligent and durable buried drainage pipe, the technical solution of the separation and transmission method of the present invention is as follows: The magnetic substances in the pipeline are magnetically attracted to the inner wall of the outer pipe of the pipeline before entering the inner pipe. The magnetic force is provided by the permanent magnets arranged on the outer wall of the outer pipe. The channel used for separation and transportation of magnetic substances is formed between the inner and outer pipes in the pipeline. The energized electromagnet can attract the permanent magnet to slide, which drives magnetic substances into the channel used for separation and transportation of magnetic substances. The attraction force of the electromagnet is greater than that of the permanent magnet, enabling the magnetic substances attracted by the permanent magnet to be attracted by and transferred to the electromagnet. The distance sensor located on the electromagnet is used to set the first distance limit. When the distance between the permanent magnet and the distance sensor reaches the distance limit, the distance sensor turns off the switch that energizes the electromagnet; as a result, the electromagnet loses its magnetic force and the magnetic substances previously transferred and adsorbed by the electromagnet are discharged together with water from the channel used for separation and transportation of magnetic substances. The permanent magnet is bounced away by the elastic telescopic member. After the permanent magnet is bounced away from the end of the inner pipe, it will reach the second distance limit set by the distance sensor.

At the second distance limit, the distance sensor will energize the control switch, and the electromagnet will repeatedly attract the permanent magnet. At the drain of the pipeline, the inner pipe is extended to the drainage area to discharge water, to the channels used for separation and transportation of magnetic substances, and to the collecting area of magnetic substances.

The permanent magnet cyclically slides to continuously transfer the magnetic substances to the channel used for separation and transportation of magnetic substances, so that the magnetic substances are separated to the outer pipe without entering the inner pipe. This thereby facilitates the recycling of magnetic substances.

As an improvement of the separation and transmission method of the present invention, two distance sensors are provided. The two distance sensors are used to set the first and second distance limits and to enable the disconnection and reconnection of the switch, respectively. The disconnection and reconnection of the switch are triggered by the two distance sensors. This helps the unit to detect any issues with setting of the first or second distance limit during maintenance, which affects the operation of the device.

As an improvement of the separation and transportation method of the present invention, the intelligent and durable buried drainage pipe is only installed in a section adjacent to the drainage port. Only at the drainage port, an inner pipe and an outer pipe are available and magnetic substances are separated. This helps save costs and facilitates check, repair, or installation, and disassembly, and has little impact on the entire drainage system.

The invention is able to automatically treat magnetic substances in the water as well as to separate and convey these substances. This is conducive to the centralized treatment and recycling of the magnetic substances in the drainage.

Details of the Unit

The technical solutions in the unit of the present invention will be clear and complete in conjunction with the accompanying drawings in the units of the present invention. Obviously, the described units are only a part of the units of the present invention, rather than all the units. Based on the units of the present invention, all other units obtained by those of ordinary skill in the art without creative work shall fall within the protection scope of the present invention.

Figure 1:
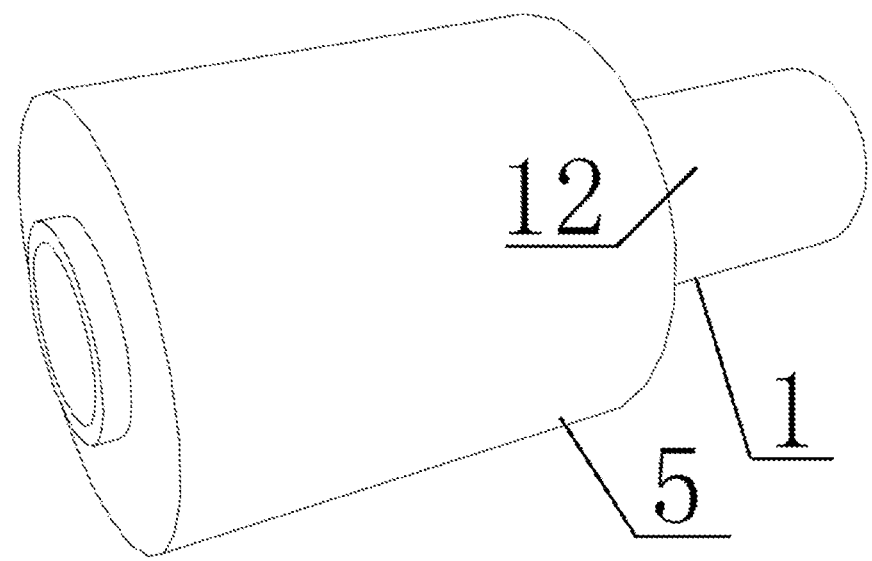
FIG. 1 A schematic diagram of the structure of the unit.
Figure 2:
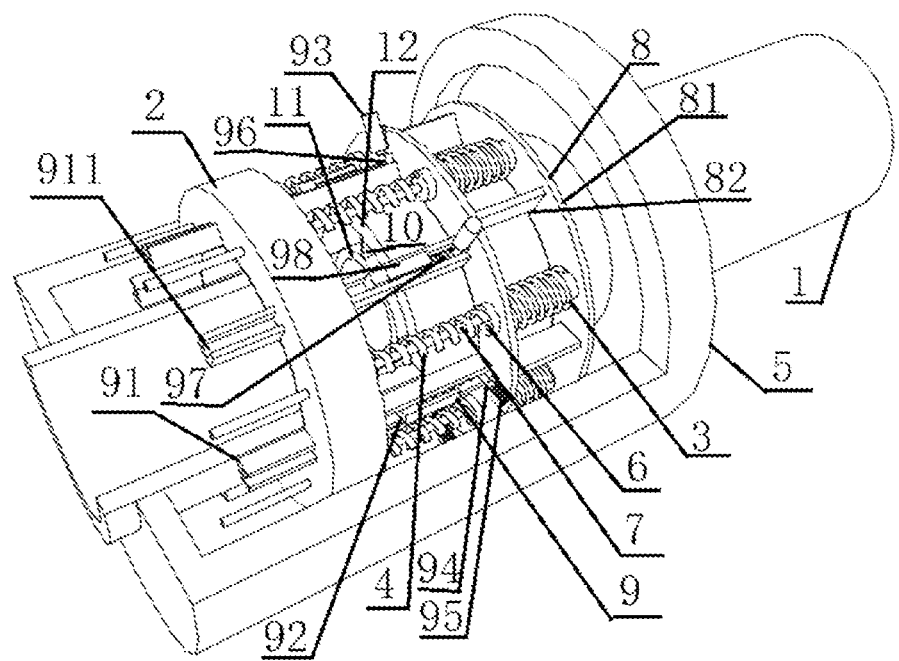
FIG. 2 A schematic diagram of the partially sectioned structure of the unit.
Reference signs of the drawings: 1. Pipeline; 11. Inner pipe; 12. Outer pipe; 2. Permanent magnet; 3. Electromagnet; 4. Spring; 5. Housing; 6. Distance sensor; 7. Sliding rod; 8. Fixing bracket; 81. Ring plate; 82. Support rod; 9. Impact device; 91. Slide rail; 911. Sliding chute; 92. Push block; 93. Impact cylinder; 94. Impact ball; 95. First elastic member; 96. Impact block; 97. Second elastic member; 98. Push rod; 10. Support bar.

FIGS. 1 and 2 show an intelligent and durable buried drainage pipe, which includes the pipeline (1) made of non-magnetic and aging-resistant materials. The pipeline (1) has a section of two layers, which consists of the inner (11) and outer pipes (12) which extend to the drain. Between the inner (11) and outer pipes (12), a support bar (10) extending along the axial direction of the pipeline (1) is available. The outer pipe (12) is longer than the inner pipe (11), and on the section of the outer pipe (12) longer than the inner pipe a circular permanent magnet (2) is provided and is adapted to the shape of the outer pipe (12). The permanent magnet (2) can slide along the outer wall of the outer pipe (12) in the axial direction of the pipeline (1). On the outer pipe (12), six electromagnets (3) are fixed at intervals from the permanent magnet (2) and distributed at an angle of 60 degrees along the axial direction of the outer pipe (12). When the electromagnets (3) are energized they attract the permanent magnet (2) causing it to slide. The distance between the electromagnet (3) and the permanent magnet (2) is greater than the distance of axial length between the permanent magnet (2) and the inner pipe (11). The end of the electromagnet (3) facing the permanent magnet (2) is provided with a distance sensor (6), and the coil of the electromagnet (3) is connected to a switch (the portion of the wire connection and the switch are omitted in the figure). The switch is turned on/off by the distance sensor (6).

Between the permanent magnet (2) and the electromagnet (3), an elastic telescopic member (4) is installed; the two end are fixed to the permanent magnet (2) and the electromagnet (3), respectively. The attraction force of the electromagnet (3) is greater than that of the permanent magnet (2). The housing (5) is sleeved on the section of the outer pipe (12) provided with the permanent magnet (2) and the electromagnet (3). The outer pipe (12) is used to transmit magnetic substances to a collecting area and the inner pipe (11) extends to the drainage area.

Because the outer pipe (12) is longer than the inner pipe (11), the magnetic substances gather in the outer pipe (12) before entering the inner pipe (11), and are adsorbed on the inner wall of the outer pipe (12) by the permanent magnet (2). The energized electromagnet (3) can attract the permanent magnet (2), i.e. transfer the magnetic substance adsorbed by the magnet (2) to the electromagnet (3). The magnetic substances may be ferromagnetic metal, and so on. The pipeline (1) can also be made of polyethylene, chlorinated polyvinyl chloride or hard polyvinyl chloride and other materials with good aging resistance, or bellows can be employed. The electromagnet (3) should be used to transfer magnetic substances between the inner pipe (11) and the outer pipe (12). The permanent magnet (2) directly carries magnetic substances between the inner (11) and outer pipes (12). This prevents magnetic substances from entering the inner pipe (11) and allows the complete collection, separation and discharge of those substances by the outer pipe (12), followed by the transfer and adsorption of the substances by the electromagnet (3). Then the distance limit is set by the distance sensor (6). When the permanent magnet (2) reaches the distance limit, the energization switch of the electromagnet (3) is turned off to de-energize the electromagnet (3). In this way, the magnetic substances are no longer attracted to the permanent magnet (2), and the magnetic substances flow away along with the water; then, the permanent magnet (2) is bounced by the elastic telescopic member (4). When the permanent magnet (2) moves to its original position, it will reach another distance limit set by the distance sensor (6). At this time, the distance sensor (6) controls the connection of the switch again to re-energize the electromagnet (3), so that the permanent magnet (2) can carry the magnetic substances cyclically, and the magnetic substances enter between the inner (11) and outer pipes (12). The distance sensor (6) is remotely set by AI and other smart devices. This facilitates the adjustment of distance limit or check, which is conducive to the intelligent separation of magnetic substances in the pipeline (1). A housing made of iron may be used as the housing (5) made of magnetically conductive materials as it can prevent magnetic flux leakage. The outer pipe can be used to carry magnetic substances to a collecting area. The inner pipe (11) can be extended by a section to a special drainage area.

In this unit, an elastic telescopic member (4) is a spring which boasts excellent telescopic performance and can provide a sufficient distance for the permanent magnet (2) to carry magnetic substances. This enables magnetic substances to enter between the inner (11) and outer pipes (12), and the permanent magnet (2) bounces away.

In this unit, the sliding rod (7) is inserted in the center of the spring. One end of the sliding rod (7) is fixed to the electromagnet (3) and the other end slides through the permanent magnet (2). If the spring falls off, it will still surround the sliding rod (7) and continue to exert its telescopic function, and the sliding rod (7) can also serve as a sliding track for the permanent magnet (2) to prevent its circumferential displacement and damage to the spring.

In this unit, the fixing bracket (8) for securing the electromagnet (3) is fixed on the outer pipe (12). The fixing bracket (8) includes a ring plate (81) fixedly arranged along the circumference of the outer pipe (12). The fixing method can be a welded or bolted connection. Two ring plates (81) are used for securing the front and rear ends of the iron core of the electromagnet (3). Six electromagnets (3) are distributed at intervals along the circumference of the ring plate (81). The two ring plates are fixed and connected by a support rod (82). The fixing bracket (8) facilitates the installation or removal of the electromagnet (3).

In this unit, the impact device (9) is provided on the ring plate (81) close to the permanent magnet (2). The impact device (9) includes a slide rail (91) which is arranged along the axial direction of the outer pipe (1) and fixed onto the ring plate (81) at one end. The slide rail (91) has a sliding chute (911) distributed along its axial direction. A slidable push block (92) is arranged in the sliding chute (911) and is located between the permanent magnet (2) and the ring plate (81). The other end of the sliding rail (91) slides through and maintains the sliding fit with the permanent magnet (2). An impact cylinder (93) is secured on the ring plate (81) close to the sliding chute (911), and the mouth of the impact cylinder (93) faces the sliding chute (911). A semi-exposed impact ball (94) is provided at the mouth of the cylinder. A first elastic member (95) is provided between the impact ball (94) and the bottom of the impact cylinder (93). One end of the first elastic member (95) is fixed and connected to the impact ball (94), and the other end is fixed and connected to the bottom of the impact cylinder (93). When the impact ball (94) stops, one half of its bottom abuts against an impact block (96), and the other half is closer to the push block (92) than the impact block (96). The impact block (96) is clamped at the junction of the sliding chute (911) and the ring plate (81). The bottom of the side of the push block (92) facing the ring plate (81) is connected to one end of the second elastic member (97). The other end of the second elastic member (97) is fixed and connected to the impact block (96). The side of the push block (92) facing the ring plate (81) is provided with a push rod (98) extending in the axial direction of the outer pipe (12). When pushing the push block (92) to slide, the push rod (98) hits the impact ball (94) and enables the ball to slide into the impact cylinder (93).

When the permanent magnet (2) moves toward the electromagnet (3), it hits and moves the push block (92), and the push block (92) travels along the sliding chute (911) toward the impact ball (94). After the sliding distance is set, the push rod (98) on it will hit the impact ball (94). The impact ball (94) will rush into the impact cylinder (93). Under the influence of the first elastic member (95), the impact ball (94) pops out of the impact cylinder (93) and hits the impact block (96). The impact block (96) transmits the impact to the slide rail (91) which is secured on the outer pipe (12). The force of the impact is transmitted to the outer pipe (12), causing the wall of the outer pipe (12) to vibrate and to shake off any magnetic substances adhering to the inner wall of the outer pipe (12). When excessive amounts of magnetic substances adhere on the inner wall of the outer pipe (12), this will likely reduce the magnetic force of the permanent magnet (2) or the electromagnet (3) in the outer pipe (12), which is not conducive to transferring of more magnetic materials.

In this unit, both the first (95) and second elastic members (96) are springs. Springs are characterized by excellent telescopic performance and scope, and great elasticity.

The present invention also provide a method of separation and transportation of magnetic substances using the aforesaid intelligent and durable buried drainage pipe. Before the magnetic substances in the pipeline (1) enter the inner pipe (11), they are magnetically attracted to the inner wall of the outer pipe (12) of the pipeline (1). The attraction force is provided by a permanent magnet (2) arranged on the outer wall of the outer pipe (12). A channel used for separation and transportation of magnetic substances is formed between the inner (11) and outer pipes (12) in the pipeline. The energized electromagnet (3) attracts the permanent magnet (2) to slide and to carry magnetic substances into the channel used for the separation and transportation of magnetic substances. When the attraction force of the electromagnet (3) is greater than the attraction force of the permanent magnet (2), the magnetic substances attracted by the permanent magnet (2) are transferred to and attracted by the electromagnet (3). A distance sensor (6) on the electromagnet (3) is used to set the first distance limit. If the distance between the permanent magnet (3) and the distance sensor (6) reaches the first distance limit, the distance sensor (6) will turn off the switch that energizes the electromagnet (3), the electromagnet (3) will lose its magnetic force, and the magnetic substance absorbed by the electromagnet (3) will be discharged together with water from the channel used for separation and transportation of magnetic substances. Then the permanent magnet (2) is bounced by the elastic telescopic member (4). After the permanent magnet (2) is bounced away from the end of the inner pipe (11), it will reach the second distance limit set by the distance sensor (6). When the second distance limit is reached, the distance sensor (6) will energize the control switch, and the electromagnet (3) will repeatedly attract the permanent magnet (2). At the drainage port of the pipeline (1), the inner pipe (11) is extended to the drainage area for drainage, and the magnetic substances are separated and transported to the channel used for separation and conveying of magnetic substances and to the collecting area of magnetic substances.

The permanent magnet (2) slides cyclically to continuously transfer any magnetic substances to the channel used for the separation and transportation of magnetic substances. In this way, the magnetic substances are separated to the outer pipe (12) without entering the inner pipe (11), thereby facilitating the recycling of magnetic substances.

Based on this method, there may be two distance sensors (6), which sets the first and second distance limits and controls the disconnection and reconnection of the switch. The disconnection and reconnection of the switch are triggered by the two distance sensors. This helps detect any issues with setting of the first or second distance limits during maintenance, which affects the operation of the device.

In this method, the intelligent and durable buried drainage pipe is only installed in a section close to a drain. Only at the drainage port, an inner (11) and outer pipes (12) are available and magnetic substances are separated. This helps save cost and facilitates detection, maintenance, installation, and disassembly, and has little impact on the entire drainage system.

The invention is able to automatically treat magnetic substances in water as well as separate and convey these substances. This is conducive to the centralized treatment and recycling of magnetic substances in the drainage.

The foregoing is a further detailed description of the present invention in conjunction with specific preferred units, and it shall not be considered that the specific implementation of the present invention is limited to these descriptions. For those skilled in the art of using the present invention, without departing from the concept of the present invention, several equivalent substitutions or obvious modifications with the same performance or use are possible and shall be regarded as falling within the protection scope of the present invention.

The invention claimed is:

1. An intelligent and durable buried drainage pipe comprising a pipeline (1) composed of non-magnetic and aging-resistant materials; a first section of the pipeline (1) comprises an inner pipe (11) and an outer pipe (12) that extends to a drain; a support bar (10) extends along an axis of the pipeline (1) and is arranged between the inner pipe (11) and the outer pipe (12) wherein the outer pipe (12) is longer than the inner pipe (11); a permanent magnet (2) is provided on the outer pipe (12) on a section of the outer pipe (12) that is longer than the inner pipe (11); the permanent magnet (2) is configured to slide along an outer wall surface of the outer pipe (12) in an axial direction of the pipeline (1); at least one electromagnet (3) is fixed on the outer pipe (12) at an interval from the permanent magnet (2) so that the electromagnet (3) is configured to attract the permanent magnet (2) and cause the permanent magnet (2) to slide; a distance between the electromagnet (3) and the permanent magnet (2) is greater than a distance between the permanent magnet (2) and the inner pipe (11) along an axial length of the pipeline (1); an end of the electromagnet (3) facing the permanent magnet (2) is provided with a distance sensor (6); a coil of the electromagnet (3) is connected to a switch and the switch is turned on or off by the distance sensor (6); an elastic telescopic member (4) is provided between the permanent magnet (2) and the electromagnet (3); a first end of the elastic telescopic member (4) is fixed with the permanent magnet (2), and a second end is secured with the electromagnet (3); an attraction force of the electromagnet (3) is greater than an attraction force of the permanent magnet (2); a section of the electromagnet (3) is sheathed with a magnetically conductive housing (5); and the outer pipe (12) is used to transmit magnetic substances to a collecting area and the inner pipe (11) extends to a drainage area.

2. The intelligent and durable buried drainage pipe of claim 1, wherein the elastic telescopic member (4) is a spring.

3. The intelligent and durable buried drainage pipe of claim 2, wherein a sliding rod (7) is inserted in a center of the spring; a first end of the sliding rod (7) is fixed and connected to the electromagnet (3), and a second end of the sliding rod (7) slides through the permanent magnet (2).

4. The intelligent and durable buried drainage pipe of claim 1, wherein a fixing bracket (8) for securing the electromagnet (3) is fixed on the outer pipe (12); the fixing bracket (8) comprises two ring plates (81) securely installed along a circumference of the outer pipe, the two ring plates (81) are used to fix a front end and a rear end of an iron core of the electromagnet (3); and the two ring plates (81) are fixed and connected by a support rod (82).

5. The intelligent and durable buried drainage pipe of claim 4, wherein an impact device (9) is provided on a ring plate of the two ring plates (81) adjacent to the permanent magnet (2); the impact device (9) comprises a slide rail (91) installed axially along the outer pipe (1); a first end of the slide rail (91) is secured on the ring plate; the slide rail (91) comprises a sliding chute (911) distributed along an axial direction of the slide rail (91); a slidable push block (92) is arranged in the sliding chute (911) and is located between the permanent magnet (2) and the ring plate; a second end of the slide rail (91) slides through and maintains a sliding fit with the permanent magnet (2); an impact cylinder (93) is mounted on the ring plate near the sliding chute (911); a mouth of the impact cylinder (93) faces the sliding chute (911) and is provided with an impact ball (94); a first elastic member (95) is installed between the impact ball (94) and a bottom of the impact cylinder (93); a first end of the elastic member (95) is fixed and connected to the impact ball (94), and a second end of the elastic member (95) is fixed and connected to the bottom of the impact cylinder (93); when the impact ball (94) stops, a first half of a bottom of the impact ball (94) abuts against the impact block (96) and a second half is closer to the push block (92) than the impact block (96); the impact block (96) is clamped at a junction of the sliding chute (911) and the ring plate; a bottom of a side of the push block (92) facing the ring plate is connected to a first end of a second elastic member (97); a second end of the second elastic member (97) is fixed and connected to the impact block (96); a side of the push block (92) facing the ring plate is installed with a push rod (98) that extends in the axial direction of the outer pipe (12); and the push rod (98) is configured to hit the impact ball (94) and enables the impact ball (94) to slide into the impact cylinder (93) when the push block (92) slides.

6. The intelligent and durable buried drainage pipe of claim 5, wherein both the first elastic member (95) and the second elastic member (96) are springs.

7. A method of separation and transmission using the intelligent and durable buried drainage pipe of claim 1, comprising the following steps: any magnetic substances in the pipeline (1) are magnetically attracted to an inner wall of the outer pipe (12) of the pipeline (1) before entering the inner pipe (11); a magnetic force is provided by permanent magnets (2) distributed on the outer wall of the outer pipe (12); a channel used for the separation and transmission of magnetic substances is formed between the inner pipe (11) and the outer pipe (12) in the pipeline (1); the electromagnet (3) is configured to attract the permanent magnet (2) to slide, which drives the transfer of magnetic substances into the channel used for the separation and transmission of the magnetic substances; when an attraction force of the electromagnet (3) outweighs an attraction force of the permanent magnet (2), the magnetic substances attracted by the permanent magnet (2) are transferred to and attracted by the electromagnet (3) and a first distance limit is set by the distance sensor (6) on the electromagnet (3); after a distance between the permanent magnet (2) and the distance sensor (6) reaches the first distance limit, the distance sensor (6) turns off a switch that energizes the electromagnet (3), and the electromagnet (3) loses its magnetic force; the magnetic substances transferred and absorbed by the electromagnet (3) are discharged from the channel used for separation and transmission of the magnetic substances, together with water; after the permanent magnet (2) is bounced by the elastic telescopic member (4), and is away from an end of the inner pipe (11), a second distance limit will be reached; wherein when the second distance limit is reached, the distance sensor (6) controls the connection of the switch, and the electromagnet (3) repeatedly attracts the permanent magnet (2); at the drain of the pipeline (1), the inner pipe (11) extends to the drainage area for draining water; and the magnetic substances are transferred to the channel used for the separation and transmission of the magnetic substances and the collecting area of magnetic substances.

\* \* \* \* \*